INVENTOR:
DON J. MARSHALL
BY Howson & Howson
ATTYS.

June 15, 1965  D. J. MARSHALL  3,189,370
HOSE COUPLING CONNECTION FOR WIRE REINFORCED ELASTOMERIC CABLES
Filed July 13, 1962  3 Sheets-Sheet 3
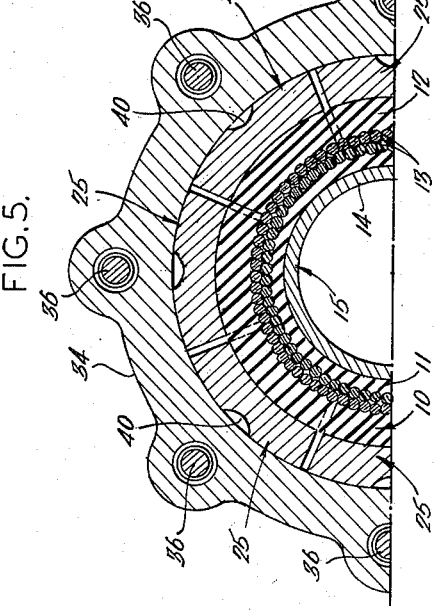
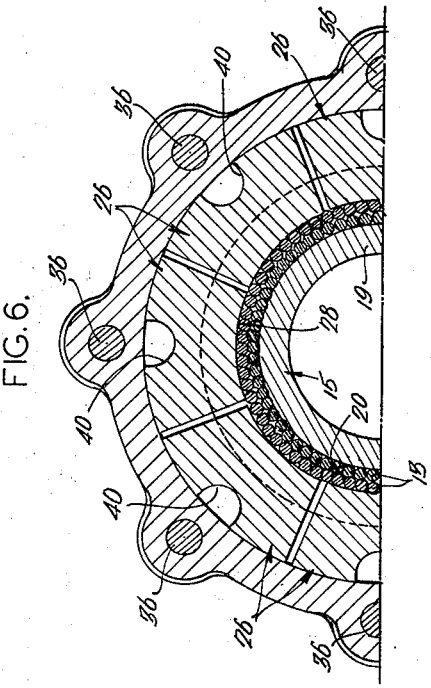
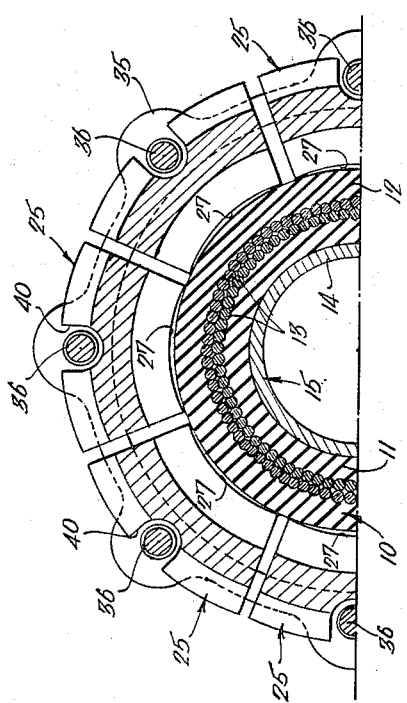
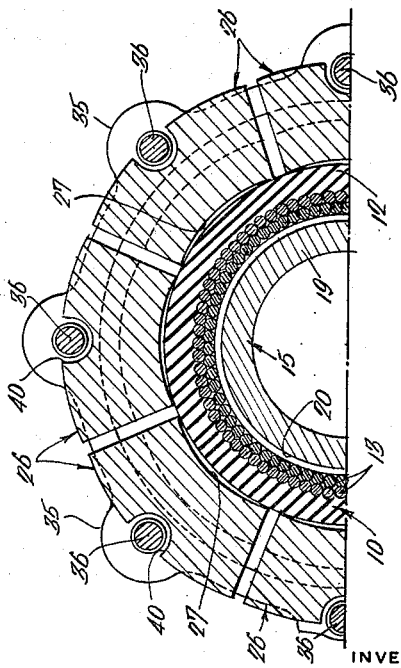
INVENTOR:
DON J. MARSHALL
BY
Howson & Howson
ATTYS.

United States Patent Office 3,189,370
Patented June 15, 1965

3,189,370
HOSE COUPLING CONNECTION FOR WIRE REINFORCED ELASTOMERIC CABLES
Don J. Marshall, Edgewater, Md., assignor to Dixon Valve & Coupling Company, Philadelphia, Pa., a corporation of Pennsylvania
Filed July 13, 1962, Ser. No. 209,520
3 Claims. (Cl. 285—27)

This invention relates to a hose connection, especially to a connection for cable or wire-reinforced hose for extremely high pressures and heavy longitudinal loadings, and has for an object the provision of improvements in this art.

This invention is an improvement for a special use upon the invention disclosed in my copending application, S.N. 209,519, filed July 13, 1962.

The invention provides a two-part gripping action longitudinally or axially of the hose, one a strong holding grip on the wire reinforcement of the hose adjacent the end of the hose which permits substantially no axial movement of the hose relative to the connection and the other a less rigid sealing grip on the rubber (i.e., elastomeric) components of the hose at a distance from the end of the hose which does permit a very small amount or incremental movement to initiate a self-tightening action which is transmitted back to the end of the hose.

The invention also provides axially divided gripping wedge segments with tapered wedge surfaces at opposite ends which are able to move inward radially by different distances in different axially divided parts to perform different gripping functions.

The invention also provides different gripping elements on the nipple and wedge segments at different axial locations for performing different gripping functions.

The invention also provides means for initially holding the gripping wedge segments in accurate circumferential position so that when tightened each segment will carry an equal share of the load.

The invention also provides means for initially gaging the location of parts along the axis of the assembly so that when the parts are tightened the full design strength and efficiency of the connection will be realized.

The invention also provides improved sealing means at the inner end of the connection and between the nipple and the inside of the hose.

The objects of the invention as well as various novel features and advantages will be apparent from the following description of an exemplary embodiment, reference being made to the accompanying drawings, wherein:

FIG. 3 is a transverse section taken on the line 3—3 of FIG. 1;

FIG. 4 is a transverse section taken on the line 4—4 of FIG. 1;

FIG. 5 is a transverse section taken on the line 5—5 of FIG. 2; and

FIG. 6 is a transverse section taken on the line 6—6 of FIG. 2.

Figure 1:
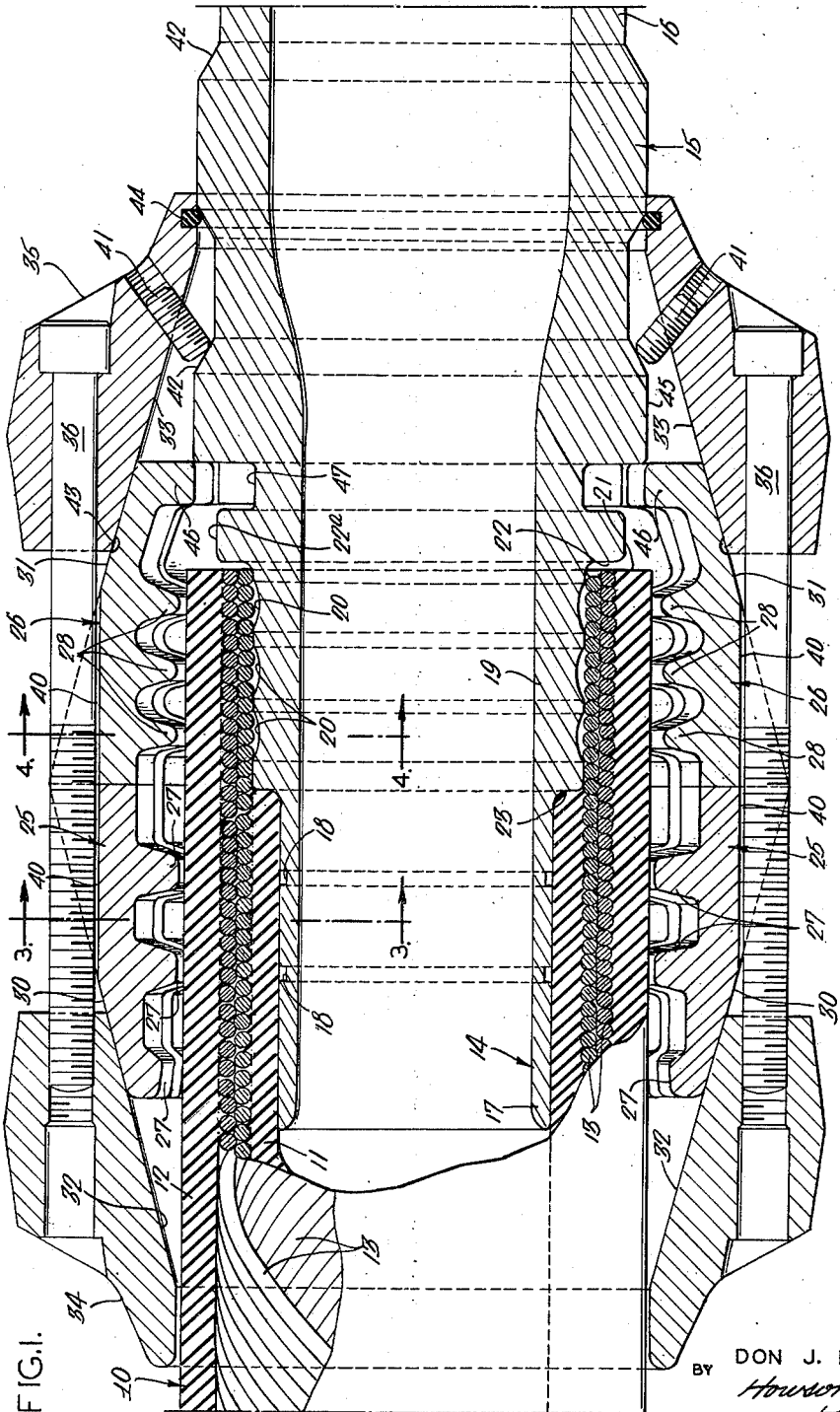
FIG. 1 is a longitudnal or axial section of a hose connection embodying the invention, the parts being shown in the position before tightening.
Figure 2:
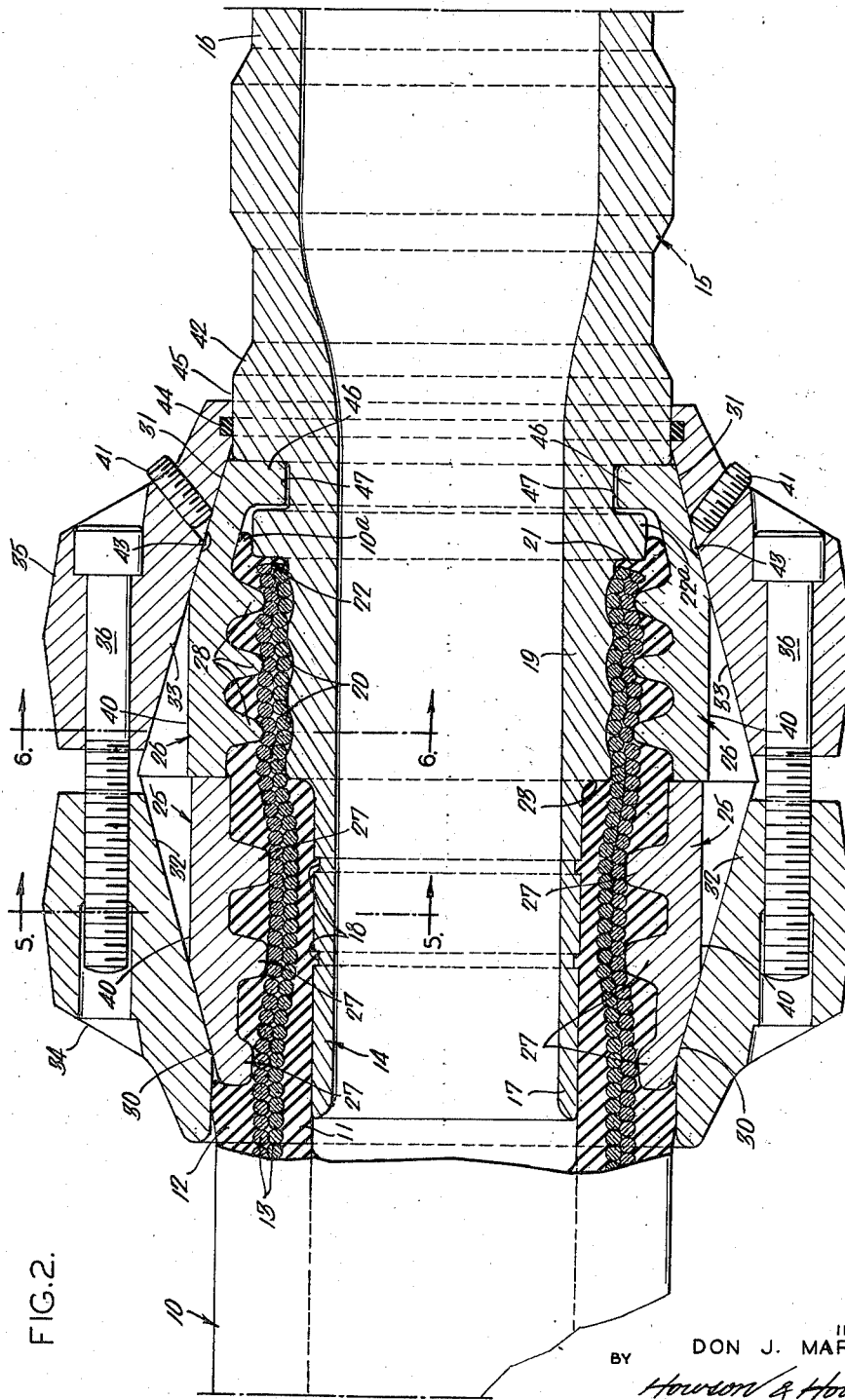
FIG. 2 is a view like FIG. 1 but showing the position of parts after tightening.

Referring to the drawings, a hose 10 to be connected includes an inner layer 11 of rubber or other suitable elastomeric material, an outer layer 12 of elastomeric material and spiral cross-wound reinforcement 13 such as spring wire laid for strength at an angle of about 52 degrees to a transverse plane.

The hose is telescoped on the cylindrical portion 14 of a nipple 15 which forms the principal load-bearing member of the connection and the inner end 16 of the nipple is suitably formed for coupling to a similar hose connection or some other desired anchorage, as to a tank, standpipe, or the like.

The hose-engaging portion 14 of the nipple has its outer surface formed on two diameters and of different shapes, the outer portion 17 being of relatively smaller diameter and relatively smooth except for grooves 18 into which rubber is squeezed to form a seal, and the inner portion 19 being of relatively larger diameter and provided with axially spaced annular grooves 20 into which the reinforcing wires are bent when the connection is tightened.

Before the hose is telescoped on the nipple the inner layer or lining of rubber 11 is cut out from the end to expose the wire reinforcement 13 which fits on the enlarged portion 19 of the nipple. The outer layer of rubber 12 is left on the hose out to its transverse end face 21 which abuts a radial annular face 22 on annular rib 22a of the nipple. The end face of the inner layer of rubber 11 abuts an annular radial surface 23 which constitutes the riser between the small-diameter portion 17 and the larger-diameter portion 19 of the nipple.

The hose is gripped on the nipple by a plurality of hard rigid wedge segments 25 of an outer ring and wedge segments 26 of an inner ring, in the present case there being eight segments in each ring group of segments.

The outer wedge segments 25 are provided with broad-faced round-edged circumferentially extending gripping elements, projections, or ribs 27 and the inner wedge segments 26 are provided with narrow-faced round-edged circumferentially extending gripping elements, projections, or ribs 28 which are spaced axially to stand above the middle of the grooves 20 of the nipple.

The projections 28 are of such length, thickness and spacing that in the tightened position they penetrate through the outer rubber layer 12 and engage the reinforcement 13 and bend the strands into the grooves 20.

The projections 27 are graduated in radial length from the axially outer end inward so as to have a graduated sealing action, the greatest penetration of the rubber layer being at the most inwardly disposed projections.

The wedge segments 25 and 26 have tapered portions 30 and 31 respectively which are engaged by the tapered portions 32 and 33 respectively of wedge rings 34 and 35 respectively.

The wedge rings 34 and 35 are drawn together axially by a plurality of clamp bolts or screws 36 which pass through close fitting holes of the inner ring 35 and are threaded in tapped holes of the outer ring 34.

Means are provided for initially holding the wedge gripping segments 25, 26 in correct circumferential position until they engage into the rubber covering of the hose in order that they will penetrate uniformly until the rubber is engaged by the lands or surfaces between projections and so that the same amount of rubber will be forced into each space between segments. This initial positioning means here comprises grooves or slots 40 formed in the backs of the wedge segments to embrace the clamp bolts 36 when the parts are in initial position.

Means are provided for initially positioning the connection parts in proper axial location so that when they are tightened the wedge segment projections will penetrate to the proper depth and the coupling will have maximum designed strength an defficiency. Here a plurality of gaging screws 41 are threaded in tapped holes near the inner end of the inner sleeve 35 and initially are screwed in against an inclined shoulder 42 of the nipple until grooves or indents 43 in the wedge segments 26 are even with the outer end of the inner clamp ring 35. If the grooves or indents 43 are of limited or short circumferential extent, they will be located adjacent the holes for the bolts 36 and serve as an index for aligning the slots 40 in the wedge segments with the bolts 36. There will be indents properly located for each wall thickness of hose to be connected. After the tightening has started the gaging screws are backed out to allow the parts to be pulled up together properly.

Means are provided for sealing the inner end of the connection when the parts are fully tightened, the means here shown comprising an O-ring 44 carried in a groove of the inner clamp ring 35 which engages a cylindrical surface 45 of the nipple when the parts are tightened.

Means are provided for holding the inner ring of wedge segments 26 in fixed axial location, the means here shown comprising interior inner end projections 46 of the wedge segments 26 which enter an annular groove 47 formed in the nipple.

In making the assembly the inner clamp ring 35 with its O-ring 44 installed is slipped in over the nipple until the ends of the gaging screws 41 are behind the shoulder 42. The screws 41 are turned in against the shoulder to hold the ring evenly in position with the grooves 43 lined up with the outer end of the inner clamp ring. Next the end of the hose is telescoped on the end of the nipple, the inner layer of rubber having first been cut out for the desired distance from the end. The screws 36 are pushed into the holes in the inner clamp ring 35. All of the wedge segments of both rings of segments are pushed into position with their back grooves 40 embracing the bolts. Then the outer clamp ring 34, which previously has been threaded on the hose, is brought up and the screws 36 are threaded in the tapped holes of the ring 34 and tightened to pull the parts together. Before the start of tightening the gaging screws 41 are backed out.

The parts are drawn together by axial movement without any relative circumferential friction with entailed turning tendency and loss of power by friction. Almost all applied power goes to make the penetration and when the screws are tightened by a torque wrench there is full assurance that the parts have reached their designed positions.

In making the connection the bolts or screws 36 are turned up by a torque wrench to the predetermined limit, then after a period or periods for stabilizing the tightening is repeated until the rubber substantially stops flowing. Later, if the rubber thins with pressure and age the connection can be re-tightened.

The projections 28 of the inner ring of wedge segments will penetrate through the rubber and engage the reinforcement and bend it into the grooves of the nipple. This provides a very stable strong connection which cannot loosen by rubber aging and shrinkage. The wire reinforcement is bent when the inner surfaces of the wedge segments are concentric and since the nipple surface is concentric the wire reinforcement is gripped evenly around its entire circumference. The accurate initial circumferential arrangement of the wedge segments is a factor in this tightened arrangement and a very important factor in efficiency.

The projections 27 of the outer ring of wedge segments will penetrate less deeply, this being possible because the outer and inner rings of wedge segments are separate from each other and can have a differential radial movement.

The wedge clamping action is applied from both ends of the two rings of wedge segments taken together and there is no tendency to move any of the wedge segments axially along the hose to scarf or scrape it.

If the rubber softens or shrinks with age or tends to thin in tension from high inside pressure the hose will tend to move axially off the nipple, carrying the outer ring of wedge segments 25 with it. This will cause the wedge segments to be pressed in further by the wedge action in the outer clamp ring 34. Any outward pull on the ring 34 will pull the screws 36 and pull on the inner clamp ring 35. This will pull it up on the inner ring of wedge segments, since they are anchored by their projections 46 in the groove 47, and the wedge segments 26 thereby will be forced radially inward. An end pull on the hose thus effects a double self-tightening action on the connection.

The annular projections 28 are of such length and the spaces between them are so calculated that when the wedges are fully clamped there is a flow of rubber out into the annular space provided at the outer surface of the hose to form an annular seal 10a above the annular rib 22a.

It will be noted that there are no enlargements at the ends of the tapered surfaces on the outer sides of the wedge segments, that is the tapered surfaces are unobstructed, hence there is nothing to interfere with normal hand tightening or automatic tightening action at any time even when the wedge sleeves are not symmetrically disposed axially on the wedge segments.

The following elements in various combinations produce an improved and more efficient hose connection:

(1) A smooth nipple surface presented to the inner rubber lining, there being grooves but no projections.

(2) A grooved nipple surface for the bare wire reinforcement into which the reinforcement is bent when the connection is tight.

(3) A plurality of hose gripping segments, at least four in number, to avoid tangential movement along the circumference of the hose to avoid scrafing during tightening.

(4) Gripping segment assembly tapered on both ends to avoid all axial movement during tightening thereby avoiding scarfing.

(5) Means to hold the gripping segments accurately in evenly spaced circumferential initial position until set into the hose so that the same amount of gripping will be performed by each segment and so the same amount of rubber will be forced into all spaces between segments.

(6) Axially spaced circumferentially extending projections of predetermined radial height on the gripping segments for proper penetration of the rubber together with broad stop land surfaces at the root end of the projections to engage and stop on the outer surface of the hose.

(7) Freedom from relative circumferential movement of parts during tightening so as to avoid displacement of parts and to assure maximum efficiency in the use of force applied in making the connection. Only axial and radial movements are involved in tightening.

(8) Axial limit stop means for the inner ring of wedge segments in the projections 46 and groove 47 with a complete ring of the material of the inner clamping ring embracing the interengaging means to avoid radial spread.

(9) Gage means to establish initial tightening position, specifically the groove 43 and the screws 41.

(10) A self-locking effect as the hose is urged outward by internal fluid pressure, the outer tapered surfaces of the gripping segments by engagement with the tapered surface of the outer clamping ring serving to force the gripping segments radially inward.

(11) Material at the end of the hose squeezed into an annular space provided therefor to form a seal, the projections of the wedge segments having a carefully calculated spacing and length to force the hose material into this space.

(12) The connection is reusable, reattachable, manually and automatically retensioning, which may be employed upon any hose carcass without scarfing (removing) either the outer cover or the inner lining of the hose.

(13) Freedom from stop elements on the tapered surfaces of the wedge segments.

(14) Separate types of rib elements on the inner and outer separate rings of wedge segments providing most gripping at the end of the hose and better sealing at the outer end of the gripped length of the hose and less danger of breakage here.

It is thus seen that the invention provides a very strong and reliable hose connection for the purposes required while one embodiment of the invention has been described for purposes of illustration it is to be understood that there may be various embodiments and modifications within the general scope of the invention.

I claim:

1. A hose coupling connection for cable lay reinforced hose, comprising in combination, a nipple having an inner cylindrical portion of large diameter to fit the reinforcement layer with the inner layer of rubber removed and an outer cylindrical portion of a smaller diameter to fit the interior of the hose with the inner layer of rubber remaining, axially spaced annular ribs and intervening annular grooves on said large diameter portion, a first set of wedge segments including a plurality of separate wedge segments evenly spaced around the hose, said wedge segments having axially relatively narrow round-ended circumferentially extending hard projections of a radial length sufficient to penetrate the outer layer of rubber and engage the hose reinforcement above said large diameter portion of the nipple and acting to force the reinforcement into the grooves, and a similar second set of wedge segments having axially relatively wider hard projections over the small diameter portion of the nipple for penetrating the outer layer of rubber less deeply than said relatively narrow projections of said first set, means for forcing said wedge segments radially inward to grip the hose, said last-mentioned means including a pair of clamping rings having opposed wedge surfaces cooperating with opposed wedge surfaces of said sets of wedge segments, axial clamp bolts for pulling said clamp rings together, said wedge segments having grooves embracing said clamp bolts when the parts are in initial position, the grooves in the wedge segments and the bolts having relative axial movement as the parts are tightened, said nipple having a reaction gaging shoulder, and a plurality of gaging screws in one of said clamp rings engageable with said gaging shoulder for holding the parts in desired initial position, said screws being disengaged and moving axially away from said shoulder after initial assembly.

2. A hose coupling connection, comprising in combination, a nipple having an outer hose supporting portion and an inner axial reaction portion extending inward beyond the end of the hose, a plurality of separate circumferentially spaced wedge segments spaced around the hose above the hose supporting portion of the nipple, said wedge segments having axially opposed tapered wedge surfaces of increasing height from the ends toward the mid-length of the hose supporting portion of the nipple, a pair of axially opposed clamp rings fitting over said wedge segments and having axially opposed tapered surfaces engaging the wedge surfaces of said wedge segments, the inner one of said clamp rings having an inner axial reaction portion extending inward beyond said wedge segments and embracing the axial reaction portion of said nipple, and interacting gaging means between the reaction portion of said nipple and the reaction means of said inner clamp ring, said gaging means comprising adjustable elements carried by the reaction portion of the inner clamp means which are adjusted initially to hold the parts in proper axial position and are moved out of holding position as the parts start to tighten.

3. A hose coupling connection for a wound wire reinforced cable in which the wound wire reinforcement is disposed between outer and inner layers of elastomeric material, comprising in combination, a nipple having a first cylindrical end portion of smaller diameter which fits within the inner diameter of the inner elastomeric layer and a second portion of larger diameter which fits within the inner diameter of the reinforcement when the inner layer of elastomeric material is removed, the hose in assembly having the inner layer of elastomeric material removed for the length of said second nipple portion of large diameter, said second nipple portion having axially spaced shallow circumferential grooves and intervening low raised portions, the grooves and raised portions merging in smooth gentle curves, said nipple having an annular flange with a radial shoulder engaged by the end wall of the hose in assembly, a plurality of, and at least four, hard inner edge segments embracing the end of the hose over the length of said second nipple portion which is engaged within the exposed layer of reinforcement, said inner wedge segments having circumferential inner projections with rounded ends spaced apart axially to stand above the grooves of said second nipple portion, said inner segment projections being sufficiently long radially to penetrate the outer elastomeric layer of the hose and engage the reinforcement layer and bend it into the circumferential grooves of the nipple, a plurality of, and at least four outer hard wedge segments embracing the hose over the length of said first nipple portion which is engaged within the inner layer of elastomeric material, said outer wedge segments having axially spaced circumferential inner projections with flattened inner ends with rounded edges, said projections of the outer wedge segments being of graduated length with the longest projections located at the inner end of the outer wedge segments adjacent the outer abutting ends of the inner wedge segments, said inner and outer wedge segments having oppositely directed uninterrupted tapered wedge surfaces which are highest at the abutting ends of the inner and outer segments, axially spaced circumferentially complete clamping rings having uninterrupted inclined wedge surfaces fitting the inclined surfaces of said wedge segments, means for bringing said clamping rings axially toward each other to move said wedge segments radially inward to clamp the hose on the nipple, said clamping rings being of sufficient length axially to have their distant ends overlap the distant ends of said wedge segments in all stages of assembly, said nipple constituting a first connection unit and said wedge segments and clamping rings constituting a second connection unit, means on one of said units for connecting it to an anchorage, means between said units providing axial reaction elements between them for taking axial loads imposed by internal fluid pressure, said axial reaction elements being completely surrounded by a circumferentially complete portion of the inner one of said clamping rings, and circumferential sealing means between the inner one of said clamping rings and said nipple, said nipple and inner clamping ring being provided with interengaging positioning means which are interengaged at an initial axial position for initial assembly and subsequently are moved apart during assembly, said positioning means comprising a shoulder on said nipple and circumferentially spaced screws carried by said inner clamping ring, said screws being turned in against the shoulder to place said inner clamping ring in proper axial position for initial assembly and then turned out to pass the shoulder when assembly begins.

References Cited by the Examiner

UNITED STATES PATENTS

| 1,726,808 | 9/29 | Cox | 285—323 |
| 1,887,877 | 11/32 | Shaffer | 285—259 |
| 2,120,275 | 6/38 | Cowles | 285—149 |
| 2,198,996 | 4/40 | Guarnaschelli | 285—254 |
| 2,517,606 | 8/50 | Spender | 285—149 X |
| 2,797,111 | 6/57 | Beazley | 285—149 |

FOREIGN PATENTS

| 564,619 | 10/23 | France. |

CARL W. TOMLIN, *Primary Examiner.*